United States Patent [19]
Ishida et al.

[11] 3,909,408
[45]*Sept. 30, 1975

[54] PROCESS FOR TREATING ALDEHYDES

[75] Inventors: Shinichi Ishida, Tokyo; Noboru Oshima, Yokohama; Kunio Kurita, Kawasaki; Isamu Suzuki, Yokohama; Hidetoshi Ohno, Kamakura, all of Japan

[73] Assignee: Asahi Kasei Kogyo Kabushiki Kaisha, Tokyo, Japan

[*] Notice: The portion of the term of this patent subsequent to Aug. 13, 1991, has been disclaimed.

[22] Filed: Jan. 2, 1974

[21] Appl. No.: 429,765

Related U.S. Application Data

[62] Division of Ser. No. 229,326, Feb. 25, 1972, Pat. No. 3,829,379.

[30] Foreign Application Priority Data
Feb. 27, 1971 Japan.................................. 46-9794
Feb. 27, 1971 Japan.................................. 46-9795
May 18, 1971 Japan.................................. 46-32928

[52] U.S. Cl................................... 210/59; 210/11
[51] Int. Cl.$^2$.......................................... C02B 1/18
[58] Field of Search ................... 210/18, 50, 59, 63; 423/222, 245; 260/606

[56] References Cited
UNITED STATES PATENTS
3,660,278  5/1972  Mimura et al. ...................... 210/11

OTHER PUBLICATIONS
*Chemical Abstracts*, 1961, 27045g.

*Primary Examiner*—Thomas G. Wyse
*Attorney, Agent, or Firm*—Armstrong, Nikaido & Wegner

[57] ABSTRACT

A process is provided for the effective removal of aldehyde from a mixture containing aldehyde which is either a gas or a solution which comprises treating said mixture at a pH of 6–11 with a mixed sulfite-bisulfite treating agent, whereby the aldehyde of said mixture is ecologically-efficiently eliminated.

2 Claims, 1 Drawing Figure

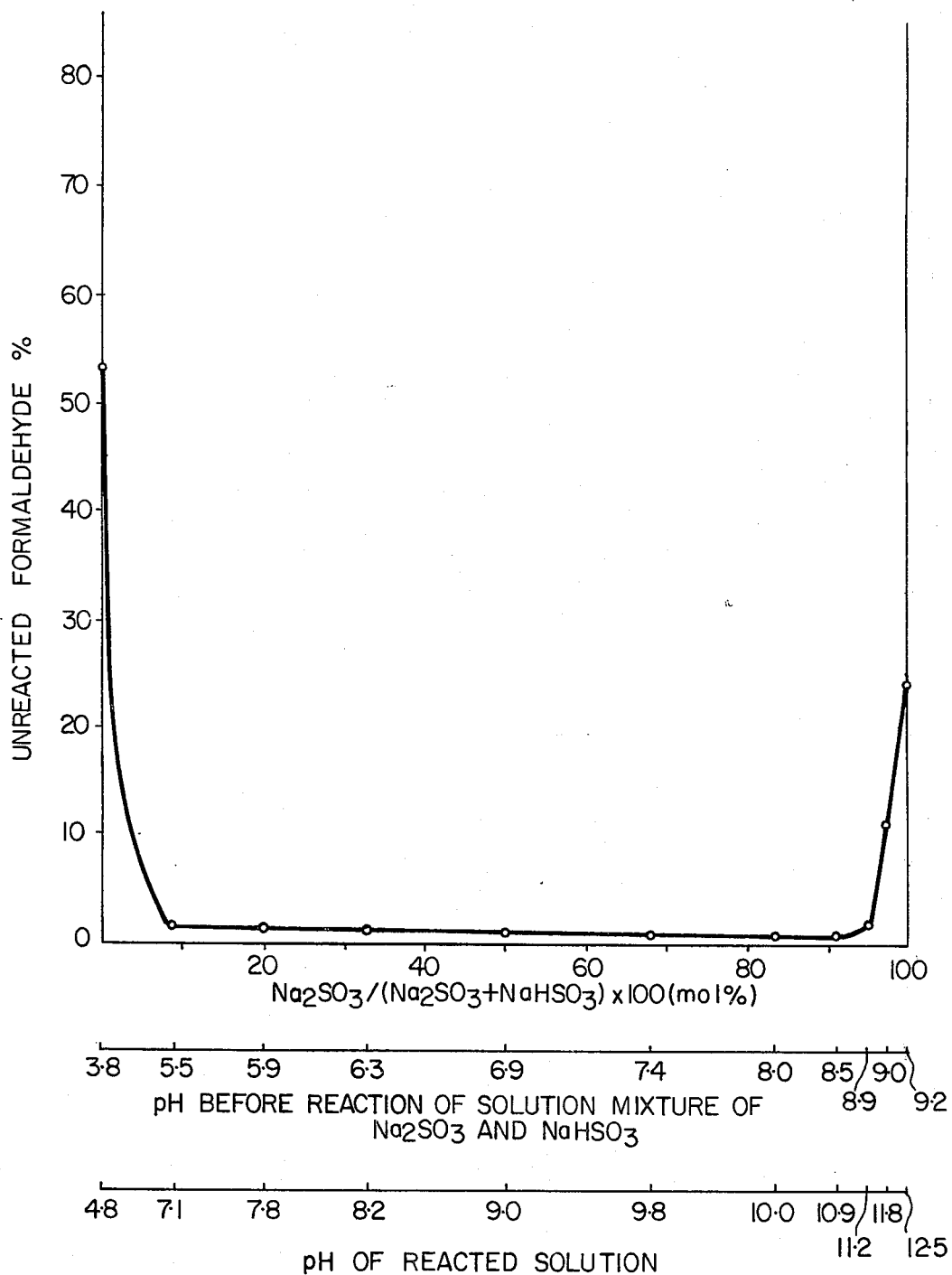

PROCESS FOR TREATING ALDEHYDES

This is a division of application Ser. No. 229,326, filed Feb. 25, 1972, now U.S. Pat. No. 3,829,379.

This invention relates to a process for treating a mixture containing aldehydes, and particularly to an improvement in a process for treating a gas or solution containing aldehydes such as formaldehyde with a mixture of sulfite and bisulfite.

Particularly, formaldehyde is widely utilized as a raw material for various synthetic resins such as polyacetal resin, urea resin, phenol resin, etc., and also as a raw material for preparing various chemicals or as an agent for treating and finishing fibers. However, formaldehyde is not thoroughly recovered or utilized in the process for producing formaldehyde as the raw material, or in the industries for utilizing the formaldehyde, and consequently the formaldehyde is usually discharged, in most cases, as a waste gas or as a dilute solution. The formaldehyde is a very toxic substance, and therefore it is necessary to pay a great attention to its disposal from the social sanitary viewpoint or from the viewpoint of preventing the environmental pollution.

As to other aldehydes, for example, acetaldehyde is an important substance as a raw material for preparing acetic acid or peracetic acid, and acrolein is also an important substance as an intermediate material for preparing acrylic acid or as a raw material for preparing synthetic resins as such. Their toxicities are equivalent to that of formaldehyde, and therefore the same attention as for the formaldehyde must be also paid to the handling or disposal of these aldehydes.

Heretofore, water absorption, catalytic oxidation-decomposition based on the use of platinum catalyst, or ammonia absorption has been known as a method for treating a waste gas containing formaldehyde. The catalytic oxidation-decomposition method is based on decomposition of formaldehyde to harmless carbon dioxide and water and can be said as an ideal method for treating the formaldehyde, but is not always an economical method because of the use of the expensive catalyst or the use of auxiliary fuel for heating.

On the other hand, the water absorption method is generally used widely as a method for removing most of formaldehyde from the waste gas at a relatively low cost, but a large amount of water and a large scrubbing apparatus are necessary for completely removing the formaldehyde from the waste gas by water scrubbing from the viewpoint of vapor-liquid equilibrium of the aqueous formaldehyde solution, and the water absorption method is not always an advantageous method. Furthermore, a large amount of dilute formaldehyde solution by water scrubbing cannot be effluent from the viewpoint of environmental pollution. The ammonia absorption method also has various difficult problems in the disposal of by-products and residual ammonia.

As a result of detailed studies on removing and making harmless the aldehydes such as formaldehyde from the viewpoint of preventing the environmental pollution, the present inventors have found a very excellent and economical method for treating the aldehydes, and have accomplished the present invention.

It has been known that the aldehydes such as formaldehyde, etc. react with sulfites and bisulfites to form addition products, but an application of said reaction to the treatment of the aldehydes such as formaldehyde, etc. as such has not given a satisfactory result to the desired treatment so far. That is to say, the sulfites react with the aldehydes and alkali is produced as a by-product, and the reaction system turns to a strong basicity. As a result, the equilibrium of reaction is shifted towards the reactant side, and smooth reaction fails to proceed.

On the other hand, when the bisulfites are used, alkali is not produced as a by-product, but the progress of the reaction itself is retarded, and the generation of gaseous sulfur dioxide gas is observed, as described later. Therefore, the mere application of the reaction never meets the desired object intended by the present inventors.

As a result of detailed studies on a process for treating the aldehydes such as formaldehyde, etc. based on the use of sulfites and bisulfites as well as said facts, the present inventors have found a very excellent and economical method for treating the aldehydes.

That is to say, an object of the present invention is to provide a process for treating aldehydes effectively and economically, characterized by treating a mixture containing the aldehydes with a mixture of a sulfite and bisulfite, while adjusting pH of a treating system to 6 to 11.

The aldehydes treated in the present invention include such saturated aliphatic aldehydes as formaldehyde, actaldehyde, propionaldehydes, butyraldehydes, valeraldehydes, etc. and such unsaturated aliphatic aldehydes as acrolein, crotonaldehyde, etc. Above all, a gas or aqueous solution containing formaldehyde is usually treated in the present invention, but a mixture of at least two of said aldehydes can be also treated in the present invention. Furthermore, there is no limitation to the state or form of these aldehydes in the present invention. That is, any state or form of the aldehydes, a gas containing the aldehydes as a main component, an aldehyde gas diluted with other gas, an aqueous solution or a solution of organic solvent such as alcohol, etc. can be used in the present invention. Furthermore, a mixture of the aldehydes in any of said states or forms with other organic or inorganic substances such as formic acid, acetic acid, propionic acid, carbonic acid, methanol, hydrochloric acid, sulfuric acid, phenol, ammonia, etc. can be treated in the present invention without any failure of the object of the present invention.

The bisulfites and sulfites used in the present invention include alkali metal salts such as lithium, sodium and potassium salts, and ammonium salts, for example, sodium bisulfite, potassium bisulfite, lithium bisulfite, ammonium bisulfite, sodium sulfite, potassium sulfite, lithium sulfite, ammonium sulfite, etc.

The ratio of sulfite to bisulfite depends upon the type of treatment, for example, batch system or continuous system, concentration of by-product salts such as sodium metahydroxysulfonate, etc., a ratio of a mixture of sulfite and bisulfite to the aldehydes to be treated, etc., but usually 0–95% by weight of the bisulfite can be used on the basis of the sulfite.

Recently, an absorption method based on an alkali (hydroxide) is widely used for treating sulfur dioxide contained in the waste flue gas, and at that time bisulfites are discharged in an excess alkali (hydroxide) state. By the reaction of the acid sulfite with excess alkali (hydroxide), sulfite is necessarily formed, and produced as a mixture of the acid sulfite and the sulfite. The resulting by-product mixture can be used in the present invention with a great economical advantage.

These bisulfite and sulfite can be used in any state or form in the present invention. For example, when the aldehydes to be treated are in an aqueous solution, solid salts as such can be used, but these salts can be usually used as an aqueous solution having a proper concentration or as a suspension of an organic medium.

By the use of a mixture of the sulfite and the bisulfite, treating efficiencies, for example, treating rate and treating effect, can be considerably improved, as compared with that attained when these salts are used singly, as described later. Further, by adjusting the pH of the treating system to a range of 6 to 11, the treating efficiency is further improved, and also a very great effect can be attained from the social-sanitary viewpoint as well as from the viewpoint of preventing waste water and air pollution, as described later.

The present invention is carried out in various modes, depending upon the state or form of the mixture containing the aldehydes to be treated. That is to say, when the mixture containing the aldehydes is supplied in a gaseous state, the present invention is carried out by contacting the gaseous mixture containing the aldehyde with an aqueous solution of a mixture of sulfite and bisulfite. For example, the use of a countercurrent scrubbing method based on a packed column or bubble cap plate column, where the gas is led to the column from the bottom to contact the aqueous solution of the mixture of sulfite and bisulfite, which flows down in the column, is a preferable mode of the embodiment.

Further, when the mixture containing the aldehydes is supplied as a solution, the ordinary liquid phase mixing reaction system, for example, a tank reactor or a pipe reactor can be used.

The ratio of the mixture of the sulfite and bisulfite to the aldehyde to be treated in at least one mole in total of the sulfite and bisulfite to one mole of the aldehyde.

The mode of carrying out the present invention must be determined from the technical level of the users in view of the concentration of the aldehydes to be supplied, the mixing ratio of the bisulfite to the sulfite, the concentration of the salt mixture and the efficiency of the treating apparatus.

Preferable treating temperature used in the present invention is 20° to 70°C in view of the reaction rate, concentration of the aldehydes in the waste gas and the concentration of the residual sulfer dioxide gas.

FIGURE shows experimental data for the present invention, where relations among the mixing ratios of the salt, pH of the reaction system and the conversion of formaldehyde are plotted when an aqueous formaldehyde solution is reacted with an aqueous solution of a mixture of sodium sulfite and sodium bisulfite.

As is clear from FIGURE, it is seen that the reaction proceeds very smoothly when the pH is in a range of 6 to 11.

For example, when a waste gas containing formaldehyde is scrubbed with the aqueous solution countercurrent method while making up a portion of the circulating aqueous scrubbing solution, the following result can be obtained.

When formaldehyde is contacted with an aqueous solution of sodium sulfite, absorption is carried out smoothly at first, but the absorption is almost discontinued soon. That is to say, unabsorbed (unreacted) formaldehyde is discharged from the treating system, and finally 43% of the introduced formaldehyde is discharged from the system.

When the formaldehyde is contacted with an aqueous solution of sodium bisulfite under the same condition, unreacted formaldehyde is discharged from the beginning, and 63% of the introduced formaldehyde is discharged from the system. Further, in that case, the sulfur dioxide concentration of the effluent gas amounts to 20 ppm, and therefore a further treatment is necessary when the effluent gas is discharged to the atmosphere. Thus, this is not economically very advantageous.

On the other hand, when the formaldehyde is contacted, for example, with an aqueous solution of a mixture of sodium sulfite and sodium bisulfite having a mixing ratio of the former to the latter of 1.00:0.20 by mole (the initial pH of the aqueous solution being 8.0) under the same condition, more than 75% of the introduced formaldehyde is absorbed, and the sulfur dioxide concentration of the effluent gas is 0.002 ppm or less. In that case, when the absorbing column is kept to preferable conditions and the concentration of formaldehyde discharged is repressed to low level to be necessary, the effluent gas can be discharged to the atmosphere without any treatment.

As shown in the foregoing simple facts, absorption efficiency of the mixture of the salts is excellent.

As one of the effects of the present invention, prevention of sulfur dioxide gas generation can be mentioned. The bisulfite is generally considered as a relatively unstable substance, and, for example, sodium bisulfite undergoes slight decomposition according to the following formula, resulting in generation of sulfur dioxide gas, and its aqueous solution exhibits an acidity.

$$2NaHSO_3 \rightarrow Na_2SO_3 + SO_2 + H_2O$$

That is to say, when only the bisulfite is used to treat the aldehydes such as formaldehyde, sulfur dioxide gas is generated at the same time, even though these aldehydes can be treated to some extent. This is not preferable from the viewpoint of the prevention of environmental pollution. On the other hand, by using the sulfite at the same time together with the bisulfite the generation of sulfur dioxide gas can be completely repressed.

As another effect of the present invention, an economy in the material of the treating apparatus can be mentioned.

As mentioned above, the aqueous solution of the bisulfite exhibits an acidity, and also the treating solution resulting from the reaction thereof with the aldehydes such as formaldehyde exhibits an acidity. Therefore, there is a great restriction to the materials for the treating apparatus, and there is an unavoidable economic disadvantage. On the other hand, by using the sulfite together with the bisulfite according to the present invention, said disadvantage can be eliminated.

It is observed that the toxicity of the solution treated according to the present invention is considerably lowered. Further, by treating the solution by activated sludge, the solution can be made almost completely harmless. As compared with the direct activated sludge treatment of a formaldehyde solution without any treatment of the present invention, lowering of COD (chemical oxygen demand) is considerably enhanced, when the solution resulting from said treatment of the present invention is treated with the activated sludge, and also it is observed that the capable BOD (biological oxygen demand) load of the sludge is larger and the activity of the activated sludge is never deteriorated. That is, the activated sludge treatment of waste aqueous solution can be very efficiently carried out in the present invention.

The well-known activated sludge treatment can be available in the present invention. That is to say, the object of the present invention can be readily attained by adding nitrogen and phosphorus compounds such as urea, ammonium nitrate, ammonium sulfate, sodium nitrate, peptone, calcium hydrogen phosphate, sodium hydrogen phosphate etc. as a nutrient for sludge to the treating solution resulting from the treatment of a mixture containing the aldehydes with a sulfite or a mixture of the sulfite and bisulfite in a pH range of 6 to 11, and carrying out the activated sludge treatment of the solution in an aeration tank according to the ordinary procedure.

It is seen from the foregoing fact that a combination of the treatment of a mixture containing the aldehydes with a mixture of the sulfite and bisulfite of the present invention in advance and the successive activated sludge treatment has a better effect than the direct activated sludge treatment of the mixture containing the aldehydes.

EXAMPLE 1

500 ml (0.5 mole of $Na_2SO_3$) of an aqueous 1 M sodium sulfite solution was charged to a 1-l glass beaker provided with a stirrer and a pH electrode, and 100 g (0.397 mole of $CH_2O$) containing 11.9% by weight of formaldehyde was added thereto with stirring.

Then, 500 ml of aqueous solutions of sodium sulfite and sodium bisulfite mixed in various ratios (concentration: 1 M) ($Na_2SO_3$ + $NaHSO_3$ = 0.5 mole) were charged to the same vessels, and 100 g (0.397 mole of $CH_2O$) of an aqueous solution containing 11.9% by weight of formaldehyde was added thereto with stirring. Total nine kinds of the solution mixtures of sodium sulfite and sodium bisulfite were prepared. That is, the following ratios, 0.03 part, 0.05 part, 0.10 part, 0.20 part, 0.50 part, 1.00 part, 2.00 parts, 4.00 parts and 10.0 parts of sodium bisulfite to one part of sodium sulfite were used, respectively. The ratios are by molar ratio of sodium sulfite to sodium bisulfite.

Temperatures before and after the reaction of the aqueous solution of sodium sulfite or a mixture of sodium sulfite and sodium bisulfite, pH of the solution, and the result of determination of the amount of unreacted formaldehyde in the solution after 10 minutes of the reaction are given in Table 1.

The result of the same test carried out for the aqueous solution of sodium bisulfite is shown therein as a comparative example.

Table 1

| Test Run No. | $Na_2SO_3/(Na_2SO_3 + NaHSO_3)\times 100$ (mole) ($Na_2SO_3/NaHSO_3$ by mole) | Temp. before reaction (°C) | Temp. after reaction (°C) | pH before reaction (solution mixture of $Na_2SO_3$+ $NaHSO_3$) | pH after reaction (reaction solution) | Unreacted formaldehyde after 10 min. of reaction (%) |
|---|---|---|---|---|---|---|
| 1 | 100 (1.00/0) | 22 | 25 | 9.2 | 12.5 | 24 |
| 2 | 97 (1.00/0.03) | 20 | 26 | 9.0 | 11.9 | 11 |
| 3 | 95 (1.00/0.05) | 20 | 26 | 8.9 | 11.2 | 1.5 |
| 4 | 91 (1.00/0.10) | 20 | 27 | 8.5 | 10.9 | 0.9 |
| 5 | 83 (1.00/0.20) | 20 | 27 | 8.0 | 10.0 | 0.8 |
| 6 | 67 (1.00/0.50) | 20 | 26 | 7.4 | 9.8 | 0.9 |
| 7 | 50 (1.00/1.00) | 20 | 26 | 6.9 | 9.0 | 1.0 |
| 8 | 33 (1.00/2.00) | 20 | 26 | 6.3 | 8.2 | 1.2 |
| 9 | 20 (1.00/4.00) | 20 | 25 | 5.9 | 7.8 | 1.3 |
| 10 | 9.1(1.00/10.00) | 20 | 23 | 5.5 | 7.1 | 1.5 |
| Comp. Ex. | 0 (0/1.00) | 22 | 24 | 3.8 | 4.8 | 53 |

EXAMPLES 2 – 7

Formaldehyde gas was scrubbed countercurrent-wise according to the present process, using a stainless steel jacketed column having an inner diameter of 5 cm, height of 1.9 m and Raschig rings having a size of 5 × 5 mm being packed.

A nitrogen gas containing 1,200 ppm of formaldehyde was blown at 60°C into the column from the bottom thereof at a rate of 20 l/min. An aqueous solution mixture containing 0.009 moles of sodium sulfite and sodium bisulfite adjusted to a constant pH by changing the mixing ratio of sodium sulfite to sodium bisulfite as shown in Table 3 was continuously supplied to the column from the top thereof at a rate of 100 ml/min. to react with the formaldehyde within the column. The reaction solution was used by recycle, and a portion of the solution was withdrawn from the bottom of the column and led to a storage tank.

As a comparative test, water was used by recycle under the same conditions in place of the aqueous solution mixture of sodium sulfite and sodium bisulfite.

In any run, the formaldehyde in the effluent gas leaving the top of the column is determined by gas chromatography or absorbed in water and determined by a colorimetric method (acetylacetone method). Sulfur dioxide contained in the effluent gas leaving the top of the column was absorbed in an aqueous solution of mercuric chloride and then determined by a colorimetric method (formalin-p-Rosaniline method).

The results are given in Table 2.

Table 2

| Ex. No. | pH of aqueous solution mixture of sodium sulfite and sodium bisulfite supplied from the top of column | pH of the reaction solution withdrawn from the bottom of the column | Formaldehyde concentration of the gas blown into the bottom of the column (ppm) | Formaldehyde concentration of the gas leaving the top of the column (ppm) | Sulfur dioxide concentration of the gas leaving the top of the column |
|---|---|---|---|---|---|
| 2 | 8.9 | 9.2 | 1210 – 1280 | 8 – 12 | 0.02 – 0.04 |
| 3 | 7.9 | 8.3 | " | 2 – 3 | 0.08 – 0.09 |
| 4 | 7.0 | 7.2 | 1250 – 1270 | 0.3 – 0.5 | 0.22 – 0.13 |
| 5 | 6.2 | 6.3 | " | 0.2 – 0.4 | 0.57 – 0.71 |
| 6 | 5.3 | 5.5 | 1220 – 1250 | 0.4 – 0.6 | 2.3 – 3.1 |
| 7 | 4.7 | 4.9 | " | 0.4 – 0.7 | 21 – 35 |
| Comp. Ex. | Water at pH 5.8 | 5.8 | 1190 – 1230 | 22 – 28 | — |

EXAMPLES 8 and 9

The reaction solutions withdrawn from the bottom of the column in Examples 4 and 5 and Comparative Example were diluted to half concentration with water, and subjected to toxic test. Red killifishes, which passed for 30 days after the purchase and grew smoothly, were kept in thermostat vessels filled with said test solutions at a temperature of 22° ± 2°C, and survival percentage after 24, 48 and 72 hours was determined. The result is shown in Table 3.

Table 3

| Ex. No. | Test solution | Survival percentage of red killifishes (%) | | |
|---|---|---|---|---|
| | | 24 hrs. | 48 hrs. | 72 hrs. |
| 9 | Reaction solution obtained in Ex. 5 was diluted to 2-fold vol. with water | 100 | 100 | 100 |
| 10 | Reaction solution obtained in Ex. 6 was diluted to 2-fold vol. with water | 100 | 100 | 100 |

EXAMPLES 10 – 17

A nitrogen gas containing formaldehyde was scrubbed countercurrent-wise according to the present invention in a counter-current scrubbing apparatus consisting of a stainless steel column having an inner diameter of 5 cm, a height of 1.9 m and a jacket, the column being packed with Raschig rings having size of 5 × 5 mm, a circulating solution tank, a circulating pump, a tank for a solution mixture of sulfite and bisulfite, a transfer pump and a pump for withdrawing the circulating solution. A distribution plate for the circulating solution was provided at the top of the column for preventing the channeling. The concentration of the solution mixture of sulfite and bisulfite was kept constant at 0.04 mol/l, and the solution mixtures corresponding to 1.1 and 2.0 parts by mole per 1.0 part by mole of the formaldehyde in the nitrogen led to the absorption column were supplied after mixing with the circulating solution just before the top of the column by a metering pump. The circulating solution was withdrawn in an amount corresponding to the amount of the solution mixture supplied, from the circulating solution tank by a metering pump. The circulating solution was introduced to the scrubbing column by a metering pump so that the liquid-gas ratios in the scrubbing column might be 7 and 10, respectively. The temperature of the solution within the column was kept to 50°C. The result of the countercurrent-wise scrubbing of the nitrogen gas containing the formaldehyde is shown in Table 4. The sulfite used in these Examples was sodium sulfite, and the bisulfite was sodium bisulfite.

Table 4

| Ex. No. | Formaldehyde concentration of the nitrogen gas (ppm) | L/G ratio | Mixing solution sulfite and bi-sulfite | pH of the solution at the top of the column | pH of the concentration at the bottom of the column | Formaldehyde dioxide tion of the effluent gas (ppm) | Sulfur concentration of the effluent gas (ppm) |
|---|---|---|---|---|---|---|---|
| 10 | 1190 | 7 | 95/5 | 8.80 | 8.93 | 10.3 | 0.002 |
| 11 | 1230 | 10 | 95/5 | 8.80 | 8.90 | 7.5 | 0.002 |
| 12 | 1150 | 7 | 90/10 | 8.25 | 8.37 | 9.2 | 0.005 |
| 13 | 1100 | 10 | 90/10 | 8.25 | 8.36 | 4.7 | 0.005 |
| 14 | 1210 | 7 | 80/20 | 7.20 | 7.33 | 6.3 | 0.007 |
| 15 | 1200 | 10 | 80/20 | 7.20 | 7.32 | 3.8 | 0.007 |
| 16 | 1190 | 7 | 50/50 | 6.33 | 6.47 | 6.2 | 0.010 |
| 17 | 1200 | 10 | 50/50 | 6.33 | 6.45 | 4.1 | 0.010 |

EXAMPLE 18

60 l of an aqueous solution containing 900 ppm of formaldehyde, 60 ppm of formic acid and 80 ppm of methanol was admixed with 240 g of sodium sulfite and well stirred. The thus treated solution showed an alkalinity, and thus hydrochloric acid was added thereto to adjust pH to 5.1. The resulting solution and the untreated raw solution were subjected to activated sludge treatment, respectively. The conditions for activated sludge treatment are given below:

Urea and potassium hydrogen phosphate were added to these sample solutions at a rate of BOD/N/P = 108/7/2, and then the solutions were led to an aeration tank and further to a treating tank, where they were treated at a BOD volume load of 2.5 kg/m³/day, MLSS load of 0.42 kg, BOD/kg, MLSS/day.

The measurements of COD and BOD of the sample solutions before or after the treatment was carried out according to Japanese Industrial Standard JIS K0102-13 and JIS K0102-16, respectively.

The results are shown in Table 5. The analytical values of the solutions treated with the activated sludge were mean analytical values of the solutions treated continuously for 7 days and sampled once in a day. In the case of sample solution treated according to the present invention, no decrease in the activity of the sludge was observed, but the decrease in the activity was observed in the case of the untreated raw solution.

However, when an aqueous 5% sodium sulfite solution was used as the scrubbing solution, a very small amount of formaldehyde, for example, the amount which was quantitatively undeterminable by the gas chromatography, was observed in the effluent gas in a ratio L/G<20, and no irritating smell was detected. Further, the recyclic use of the scrubbing solution was possible by making up a little excessive amount of sodium sulfite over the formaldehyde. The result is shown in Table 6.

Table 6

| Scrubbing solution | L/G | Formaldehyde concentration scrubbing of the effluent gas (ppm) | pH of the concentration solution after the sbsorption | Formic acid of the scrubbing solution after the absorption (%) |
|---|---|---|---|---|
| Water | 5 | 2100 | 2.2 | 0.84 |
| | 10 | 900 | 2.4 | 0.45 |
| | 20 | 400 | 2.6 | 0.23 |
| Aqueous 5% sodium sulfite solution | 5 | 0.3 | 9.5 | 0 |
| | 10 | 0.1 or less | 8.1 | 0 |
| | 20 | " | 7.6 | 0 |

EXAMPLES 20–23

A nitrogen gas containing 2.5% formaldehyde, 1.1% acetaldehyde and 0.3% propionaldehyde and also containing butane was scrubbed countercurrent-wise by various scrubbing solutions as shown in Table 7, and the effluent gas was analyzed by gas chromatography. It was found that the aldehydes could be absorbed by these scrubbing solutions. These scrubbing solutions showed a minus result in the smell sense test carried out by heating the solutions at 40°C. In the cases that the Table 5

| | Before the treatment with the activated sludge | | | | After the treatment with the activated sludge | | | | Treatment efficiency | |
|---|---|---|---|---|---|---|---|---|---|---|
| | Formaldehyde smell (heated to 80°C) | pH | COD (ppm) | BOD (ppm) | Formaldehyde smell (heated to 80°C) | pH | COD (ppm) | BOD (ppm) | COD (%) | BOD (%) |
| Untreated raw solution | observed | 6.5 | 1430 | 1560 | observed | 6.9 | 270 | 80 | 81.2 | 94.9 |
| Treated solution | none | 5.1 | 950 | 1050 | none | 6.9 | 17 | 3 | 98.2 | 99.7 |

EXAMPLE 19

A nitrogen gas containing 3.4% formaldehyde and 5.1% formic acid was passed through a gas scrubber column having a column diameter of 2.5 cm and a Raschig ring-packed height of 1.5 m at 70°C. When only water was used as a scrubbing liquid, unabsorbed formaldehyde concentration of the nitrogen gas leaving the column was still 0.04%, even if L/G was made as large as possible for the column, that is, about 20, and considerable smell was detected in the effluent gas.

scrubbing solutions were water and the aqueous 3% ammonia solution, respectively, the aldehyde smell was detected in the former case, and the aldehyde and ammonia smells were detected in the latter case. The result is shown in Table 7.

Scrubbing conditions: Scrubbing column: column diameter 2.5 cm, column height 1 m, packed part 75 cm. Temperature: scrubbing solution 30°C, L/G = 12.

pH of the scrubbing solutions in Examples 20–23 was kept to 6–10 with sulfuric acid or caustic soda.

Table 7

| Ex. No. | Scrubbing solution concentration: % | Effluent gas analysis | Sense test of the scrubbing solution after the absorption |
|---|---|---|---|
| 20 | potassium sulfite 10 | Only butane was detected | no irritating smell |
| 21 | sodium bisulfite 10 | " | " |
| 22 | ammonium sulfite 10 | " | " |
| 23 | ammonium bisulfite 10 | " | " |
| Ref. Ex. | water | Propionaldehyde, acetaldehyde, formaldehyde and butane were detected | aldehyde smell and butane smell were detected |
| | ammonia water 10 | propionaldehyde, acetaldehyde, formaldehyde, butane and ammonia detected | ammonia smell and other complicated disagreeable smells |

EXAMPLE 24

1,020 g of sodium sulfite was added to 60 l of an aqueous solution containing 3,800 ppm of formaldehyde and 1,200 ppm of phenol, and then dilute sulfuric acid was added thereto to adjust pH to 6.8. The resulting solution was diluted to five-fold with water, and subjected to activated sludge treatment under the same conditions as in Example 18. Purified water having pH 7.3, COD 20 ppm and BOD 5 was thereby obtained.

What is claimed is:

1. A process for the effective removal of formaldehyde from a mixture containing formaldehyde, which mixture is either a gas or a solution, which comprises treating said mixture at a pH of 6–11 with an aqueous solution of a mixed sodium sulfite-sodium bisulfite treating agent, the amount of said bisulfite being 0.1 to 10 mols per mol of said sulfite.

2. A process of claim 1, wherein the ratio of sodium sulfite to sodium bisulfite is about 5:1.

* * * * *